(No Model.)

W. J. SUTTIE.
NOSE PIECE FOR EYEGLASSES.

No. 284,257.  Patented Sept. 4, 1883.

WITNESSES:
Chas. Nida
C. Sedgwick

INVENTOR:
W. J. Suttie
BY Munn & Co
ATTORNEYS.

United States Patent Office.

WILLIAM J. SUTTIE, OF NEW YORK, N. Y.

NOSE-PIECE FOR EYEGLASSES.

SPECIFICATION forming part of Letters Patent No. 284,257, dated September 4, 1883.

Application filed February 13, 1882. Renewed December 19, 1882. (No model.)

*To all whom it may concern:*

Be it known that I, WILLIAM J. SUTTIE, of the city, county, and State of New York, have invented a new and useful Improvement in Nose-Pieces for Eyeglasses, of which the following is a full, clear, and exact description.

Heretofore the nose-pieces of eyeglasses have been constructed with a protecting-strip of rubber, tortoise-shell, celluloid, whalebone, and analogous materials, secured on the outer surface of the nose-piece by rivets or screws for the purpose of preventing the skin of the nose from being disfigured by coming in contact with the metal of the nose-piece; but the strips of rubber, tortoise-shell, &c., frequently crack and break while being secured on the nose-piece, and they generally break when the eyeglass is dropped, and they make the eyeglass expensive.

The object of my invention is to avoid the above-mentioned defects.

The invention consists in providing the eyeglass nose-piece with a covering layer of some non-conductor or poor conductor of heat— such as rubber, varnish, japan, or other gums— which varnish or other material is applied on the nose-piece in a liquid or plastic state, and then dried or hardened. This covering-layer does not interfere with the elasticity of the nose-piece, and protects the skin of the nose from being disfigured or marred by the metal nose-piece.

Reference is to be had to the accompanying drawings, forming part of this specification, in which similar letters of reference indicate corresponding parts.

Figure 1:
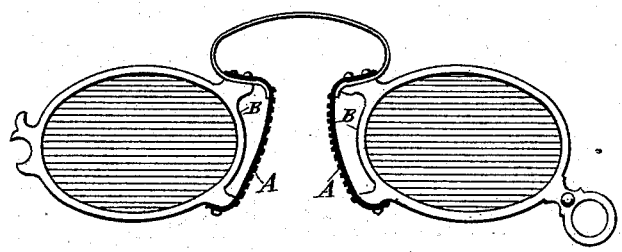
Figure 2:
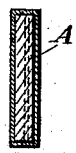

Figure 1 is a longitudinal view of an eyeglass provided with my improved nose-piece, and Fig. 2 is a longitudinal elevation of the nose-piece.

The nose-piece A, which is made stiff or elastic, as may be desired, is secured on the eyeglass-frame B in any suitable well-known manner—that is, it is either secured at the bottom and top or at the top or bottom only; or it may be pivoted or swiveled. Its outer surface, which is to rest against the nose, is either plain or serrated. I provide this outer surface of the nose-piece with a coating of varnish, japan, rubber, or other gums, or some other suitable non-conductor of heat or very poor conductor of heat.

This material—such as varnish, japan, rubber, &c.—is applied on the nose-piece in a liquid or plastic state, and then subjected to a baking or drying process. The layer of this material can be made of any desired or suitable thickness.

If the outer surface of the nose-piece is serrated, a very thin layer of this material is applied on the nose-piece, so as not to fill the recesses between the projections or serrations. The layer can be made of considerable thickness, and the serrations or transverse grooves can be cut into the thickness of this covering or protecting layer.

If desired, a layer of hard or soft rubber can be vulcanized on the nose-piece, and the outer surface of this layer can be serrated before or after vulcanizing. This fluid or semi-fluid material can be applied on the nose-piece by means of a brush; or the nose-piece can be dipped into this material.

The metal nose-piece can be made so thin that it will be elastic and yielding, and the protecting-layer will not destroy or interfere with the elasticity of the nose-piece, whereas if a protecting-strip of rubber, tortoise-shell, &c., should be secured on the nose-piece in the manner as has been heretofore customary the nose-piece would be stiffened to such an extent as to be unyielding.

The material with which the nose-piece is coated should preferably be a non-conductor of heat, as the metal nose-pieces draw the natural heat from the skin and leave disfiguring and often painful red marks or scars on the sides of the nose.

The covering-layer, if applied as I have described herein, cannot break if the eyeglass is dropped, does not crack, and is very much less expensive than the covering-strips of rubber, celluloid, tortoise-shell, and like material, which have to be secured by means of rivets or screws, and may very frequently break and crack while being secured on the nose-piece.

Having thus described my invention, I claim as new and desire to secure by Letters Patent—

As an improved article of manufacture, the nose-piece of an eyeglass-frame, coated with india-rubber or other analogous material applied in a liquid state, substantially as herein shown and described, whereby the metal of the nose-piece is kept from contact with the skin and the elasticity of the metal is not impaired, as set forth.

WILLIAM J. SUTTIE.

Witnesses:
 OSCAR F. GUNZ,
 C. SEDGWICK.